US012617997B1

(12) United States Patent
Wang et al.

(10) Patent No.: US 12,617,997 B1
(45) Date of Patent: May 5, 2026

(54) METHOD FOR PREPARING GRAPHENE THERMAL CONDUCTIVE PAD AND USE THEREOF

(71) Applicant: Shenzhen Bornsun New Material Co., Ltd., Shenzhen (CN)

(72) Inventors: Jialin Wang, Shenzhen (CN); Zhengyang Tang, Shenzhen (CN); Donghua Lu, Shenzhen (CN); Guanjin Chen, Shenzhen (CN); Zipei Li, Shenzhen (CN)

(73) Assignee: Shenzhen Bornsun New Material Co., Ltd., Shenzhen (CN)

( * ) Notice: Subject to any disclaimer, the term of this patent is extended or adjusted under 35 U.S.C. 154(b) by 0 days.

(21) Appl. No.: 19/409,801

(22) Filed: Dec. 5, 2025

(30) Foreign Application Priority Data

Feb. 21, 2025 (CN) .......................... 202510194880.9

(51) Int. Cl.
| | |
|---|---|
| *B32B 41/00* | (2006.01) |
| *B32B 5/18* | (2006.01) |
| *B32B 7/12* | (2006.01) |
| *B32B 9/04* | (2006.01) |
| *B32B 37/12* | (2006.01) |
| *B32B 38/00* | (2006.01) |
| *C09J 5/06* | (2006.01) |
| *C09J 11/04* | (2006.01) |
| *C09J 11/06* | (2006.01) |
| *C09J 11/08* | (2006.01) |
| *C09J 183/04* | (2006.01) |
| *C09K 5/14* | (2006.01) |

(52) U.S. Cl.
CPC .................. *C09K 5/14* (2013.01); *B32B 5/18* (2013.01); *B32B 7/12* (2013.01); *B32B 9/04* (2013.01); *B32B 37/12* (2013.01); *B32B 38/0004* (2013.01); *B32B 38/0008* (2013.01); *C09J 5/06* (2013.01); *C09J 11/04* (2013.01); *C09J 11/06* (2013.01); *C09J 11/08* (2013.01); *C09J 183/04* (2013.01); *B32B 2266/04* (2013.01); *B32B 2307/302* (2013.01); *B32B*

*2307/72* (2013.01); *B32B 2307/7376* (2023.05); *C09J 2400/10* (2013.01)

(58) Field of Classification Search
CPC .... C09K 5/14; B32B 5/18; B32B 7/12; B32B 9/04; B32B 37/12; B32B 38/0004; B32B 38/0008; B32B 2266/04; B32B 2307/302; B32B 2307/72; B32B 2307/7376; C09J 5/06; C09J 11/04; C09J 11/06; C09J 11/08; C09J 183/04; C09J 2400/10
USPC ..................... 156/60, 64, 350, 351, 378, 379
See application file for complete search history.

(56) References Cited

U.S. PATENT DOCUMENTS 9,437,372 B1 * 9/2016 Zhamu .................... C04B 38/02

FOREIGN PATENT DOCUMENTS

| | | | | |
|---|---|---|---|---|
| CN | 115092920 A | * | 9/2022 | ........... C01B 32/194 |
| WO | WO-2024146041 A1 | * | 7/2024 | ............ H10W 40/10 |

* cited by examiner

*Primary Examiner* — Michael N Orlando
*Assistant Examiner* — Joshel Rivera

(57) ABSTRACT

A method for preparing a graphene thermal conductive pad is referred. Graphene foam sheets are used as base materials for the graphene thermal conductive pad. The graphene foam sheets are processed by surface crust removal, laser perforation and edge trimming, plasma activation, and multiple modification treatments to yield the graphene thermal conductive pad. The plasma activation causes the hydroxyl functional groups to be generated on the graphene surface. By using hydroxyvinyl silicone oil diluted with xylene, a small amount of hydroxyvinyl silicone oil uniformly covers the graphene surface. Heating induces dehydration condensation between the hydroxyvinyl silicone oil and the hydroxyl groups generated by plasma activation, forming chemical bonds. In such a way, a tighter interface between the graphene and the subsequent adhesive is achieved, pores at the interface are reduced, thereby lowering thermal contact resistance, improving heat transfer efficiency, and enhancing tensile strength and compression resilience.

9 Claims, No Drawings

METHOD FOR PREPARING GRAPHENE THERMAL CONDUCTIVE PAD AND USE THEREOF

CROSS-REFERENCE TO RELATED APPLICATION

The present application claims priority from Chinese Patent Application No.: 202510194880.9 filed on Feb. 21, 2025, the contents of which are incorporated herein by reference in their entirety.

FIELD OF THE INVENTION

The present invention relates to the technical field of graphene thermal conduction, and particularly to a method for preparing a graphene thermal conductive pad and use thereof.

BACKGROUND OF THE INVENTION

A graphene thermal conductive pad is a thermal interface material used to improve heat conduction between electronic components and heat sinks. The graphene thermal conductive pad is prepared from graphene, which is a single layer of carbon atoms arranged in a honeycomb lattice, possessing exceptional thermal conductivity. Typically, it is a thin and flexible sheet placed between a heat-generating component (e.g., a CPU) and a heat sink, rapidly transferring heat from the component to the heat sink. Therefore, the graphene thermal conductive pad is widely applicable in electronic devices.

Thermal Interface Materials (TIMs) are commonly used in IC packaging and electronic heat dissipation, and primarily fill micro-gaps and surface irregularities generated when two materials are joined or contacted, thereby reducing contact thermal resistance and enhancing the heat dissipation performance of the device. Heat transfer at the interface typically employs thin, flexible sheets placed between the heat-generating component (e.g., a CPU) and the heat sink. These sheets exhibit high thermal conductivity along with good compressibility and resilience, enabling rapid heat transfer from the component to the heat sink, and thus find broad application scenarios in electronic devices.

Currently, the thermal interface materials with high thermal conductivity include liquid metals (40-50 W/(m·K)) and thermal greases (below 10 W/(m·K)). However, liquid metals tend to corrode the contacted metal surfaces, and since heat sinks are primarily made of aluminum substrates, stable long-term contact cannot be maintained. Thermal greases not only have insufficient thermal conductivity but also suffer from the volatilization of low molecular weight silicone oil during long-term use, leading to drying and cracking of the gel, which rapidly increases interfacial thermal resistance. Therefore, there is an urgent need for a thermal conductive pad with superior performance.

SUMMARY OF THE INVENTION

The primary objective of the present invention is to provide a method for preparing a graphene thermal conductive pad and use thereof, aiming to enhance the strength of the graphene thermal conductive pad while maintaining both thermal conductivity and resilience.

To achieve the above objective, the present invention provides a method for preparing a graphene thermal conductive pad, including the following steps:

S10, providing a plurality of graphene foam sheets;

S20, removing surface crusts from the plurality of graphene foam sheets, performing laser perforation and edge trimming, and plasma activation to obtain activated graphene foam sheets; subjecting the activated graphene foam sheets to a first modification treatment with hydroxyvinyl silicone oil to obtain a plurality of first graphene foam sheets;

S30, subjecting the plurality of first graphene foam sheets to a second modification treatment with an adhesive to obtain a plurality of second graphene foam sheets;

S40, bonding the plurality of second graphene foam sheets along a thickness direction and pressing into a block, followed by curing, to obtain a third graphene foam sheet; and S50, slicing the third graphene foam sheet along the thickness direction to obtain a graphene thermal conductive pad; wherein the adhesive includes linear low molecular weight vinyl silicone oil, linear medium molecular weight vinyl silicone oil, linear high molecular weight vinyl silicone oil, a crosslinking agent, a chain extender, a reinforcing agent, a toughening agent, a catalyst, and an inhibitor.

As an embodiment, in step S10, an average density of the graphene foam sheets is 0.15-0.25 g/cm$^3$.

As an embodiment, a thermal diffusivity of the graphene foam sheets is ≥600 mm$^2$/s.

As an embodiment, a thickness of the graphene foam sheets is 200-300 μm.

As an embodiment, in step S20, said removing surface crusts includes crushing and adhering the surface crusts.

As an embodiment, after the laser perforation and edge trimming, an average aperture of perforations is 10-200 μm, and a distance between the perforations is 100-4000 μm.

As an embodiment, the plasma activation includes using a direct injection plasma activation equipment.

As an embodiment, the first modification treatment includes coating the activated graphene foam sheets with hydroxyvinyl silicone oil diluted with xylene, and after complete absorption, performing vacuum heat treatment to obtain the plurality of first graphene foam sheets, wherein the coating includes spraying 3-9 mg of hydroxyvinyl silicone oil per square centimeter of the activated graphene foam sheets.

As an embodiment, in step S30, the second modification treatment includes spraying the adhesive onto the plurality of first graphene foam sheets and mixing to obtain the plurality of second graphene foam sheets, wherein the spraying includes spraying 70-110 mg of the adhesive per square centimeter of the first graphene foam sheets.

As an embodiment, the linear low molecular weight vinyl silicone oil is 50 cP vinyl silicone oil, the linear medium molecular weight vinyl silicone oil is 500 cP vinyl silicone oil, and the linear high molecular weight vinyl silicone oil is 20,000 cP vinyl silicone oil.

As an embodiment, a mass ratio of the 50 cP vinyl silicone oil, the 500 cP vinyl silicone oil, the 20,000 cP vinyl silicone oil, the chain extender, the crosslinking agent, the reinforcing agent, the toughening agent, the catalyst, and the inhibitor is (20-50):(60-130):(30-50):(15-25):(20-30):(3-5):(0.5-1.5):(0.3-0.6):(0.08-0.12).

As an embodiment, a mass ratio of the first graphene foam sheets to the adhesive is 1:(1-3).

As an embodiment, in the adhesive, the linear low molecular weight vinyl silicone oil includes low molecular weight silicone oil with a viscosity of 500 cP or less; and/or, the linear medium molecular weight vinyl silicone oil includes medium molecular weight silicone oil with a viscosity of 500-5000 cP; and/or, the linear high molecular weight vinyl silicone oil includes high molecular weight silicone oil with a viscosity above 5000 cP; and/or, the crosslinking agent includes side-hydrogen silicone oil; and/or, the chain extender includes end-hydrogen silicone oil; and/or, the reinforcing agent includes MQ resin; and/or, the toughening agent includes nano-grade fumed silica; and/or, the catalyst includes a platinum catalyst; and/or, the inhibitor includes an alkyne alcohol inhibitor.

As an embodiment, preparation steps of the adhesive include mixing the linear low molecular weight vinyl silicone oil, the linear medium molecular weight vinyl silicone oil, the linear high molecular weight vinyl silicone oil, the crosslinking agent, the chain extender, the catalyst, the inhibitor, the reinforcing agent, and the toughening agent.

As an embodiment, in step S40, a thickness of the third graphene foam sheet is 40-50 mm.

As an embodiment, in step S50, a thickness of the graphene thermal conductive pad is 0.3-2.0 mm.

The present invention provides a graphene thermal conductive pad, prepared by the method for preparing a graphene thermal conductive pad mentioned above.

The technical solution of the present invention provides a method for preparing a graphene thermal conductive pad. Graphene foam sheets are used as base materials for the graphene thermal conductive pad. The graphene foam sheets are processed by surface crust removal, laser perforation and edge trimming, plasma activation, and multiple modification treatments to yield the graphene thermal conductive pad. Specifically, the plasma activation causes the hydroxyl functional groups to be generated on the graphene surface. By using hydroxyvinyl silicone oil diluted with xylene, a small amount of hydroxyvinyl silicone oil uniformly covers the graphene surface. Heating induces dehydration condensation between the hydroxyvinyl silicone oil and the hydroxyl groups generated by plasma activation, forming chemical bonds. In such a way, a tighter interface between the graphene and the subsequent adhesive is achieved, pores at the interface are reduced, thereby lowering thermal contact resistance, improving heat transfer efficiency, and enhancing tensile strength and compression resilience.

DETAILED DESCRIPTION OF ILLUSTRATED EMBODIMENTS

To make the objectives, technical solutions, and advantages of the embodiments of the present invention clearer, the technical solutions in the embodiments of the present invention will be described clearly and completely below. Steps in the embodiments without specific conditions indicated shall be carried out under conventional conditions or conditions recommended by the manufacturer. Reagents or instruments where the manufacturer is not specified are conventional products obtainable through commercial purchase. Furthermore, the meaning of "and/or" appearing throughout the text includes three parallel options. Taking "A and/or B" as an example, it includes option A, or option B, or the option where both A and B are satisfied. In addition, the technical solutions between the various embodiments can be combined with each other, which must be based on the ability of a person of ordinary skill in the art to implement however. When the combination of technical solutions results in mutual contradiction or impossibility of implementation, it should be considered that such a combination of technical solutions does not exist and is not within the scope of protection claimed by the present invention. All other embodiments obtained by a person of ordinary skill in the art based on the embodiments of the present invention without making creative efforts shall fall within the protection scope of the present invention.

A graphene thermal conductive pad is a thermal interface material used to improve heat conduction between electronic components and heat sinks. The graphene thermal conductive pad is prepared from graphene, which is a single layer of carbon atoms arranged in a honeycomb lattice, possessing exceptional thermal conductivity. Typically, it is a thin and flexible sheet placed between a heat-generating component (e.g., a CPU) and a heat sink, rapidly transferring heat from the component to the heat sink. Therefore the graphene thermal conductive pad is widely applicable in electronic devices.

Currently, thermal interface materials with high thermal conductivity include liquid metals (40-50 W/(m·K)) and thermal greases (below 10 W/(m·K)). However, liquid metals tend to corrode the contacted metal surfaces, and since heat sinks are primarily made of aluminum substrates, stable long-term contact cannot be maintained. Thermal greases not only have insufficient thermal conductivity but also suffer from the volatilization of low molecular weight silicone oil during long-term use, leading to drying and cracking of the gel, which rapidly increases interfacial thermal resistance.

In view of this, to achieve the above objective, the present invention provides a method for preparing a graphene thermal conductive pad, including the following steps:

S10, providing a plurality of graphene foam sheets;

S20, removing surface crusts from the plurality of graphene foam sheets, performing laser perforation and edge trimming, and plasma activation to obtain activated graphene foam sheets; subjecting the activated graphene foam sheets to a first modification treatment with hydroxyvinyl silicone oil to obtain a plurality of first graphene foam sheets;

S30, subjecting the plurality of first graphene foam sheets to a second modification treatment with an adhesive to obtain a plurality of second graphene foam sheets;

S40, bonding the plurality of second graphene foam sheets along a thickness direction and pressing into a block, followed by curing, to obtain a third graphene foam sheet; and S50, slicing the third graphene foam sheet along the thickness direction to obtain a graphene thermal conductive pad.

Specifically, the adhesive includes linear low molecular weight vinyl silicone oil, linear medium molecular weight vinyl silicone oil, linear high molecular weight vinyl silicone oil, a crosslinking agent, a chain extender, a reinforcing agent, a toughening agent, the catalyst, and the inhibitor.

In the technical solution of the present invention, graphene foam is used as a base material for the graphene thermal conductive pad. The graphene foam is processed by surface crust removal, laser perforation and edge trimming, plasma activation, and multiple modification treatments, the yielded thermal conductive pad can better contact components and effectively fill air gaps. This not only significantly improves the heat transfer efficiency but also enhances the tensile strength and compression resilience.

Furthermore, in step S20, the plasma activation causes the hydroxyl functional groups to be generated on the graphene surface. By using hydroxyvinyl silicone oil diluted with xylene, the viscosity of the silicone oil is reduced, allowing the hydroxyvinyl silicone oil to uniformly cover the graphene surface. Heating induces dehydration condensation between the hydroxyvinyl silicone oil and the hydroxyl groups generated by plasma activation, forming chemical bonds. In such a way, a tighter interface between the graphene and the subsequent adhesive is achieved, pores at the interface are reduced, thereby lowering thermal contact resistance, improving heat transfer efficiency, and enhancing tensile strength and compression resilience.

In some embodiments of the present invention, step S10 involves providing a plurality of graphene foam sheets.

Graphene foam is a three-dimensional porous material composed of graphene or its derivatives, possessing a sponge-like structure. This material combines the unique physical and chemical properties of graphene with the lightweight and high specific surface area characteristics of foam materials, and its high thermal conductivity makes it suitable as a base material for graphene thermal conductive pads.

Furthermore, in step S10, the average density of the graphene foam sheets is 0.2-0.3 g/cm$^3$. Within the density range, the graphene foam sheets exhibit high flexibility and thermal conductivity. The thermal diffusivity of the graphene foam sheets is ≥600 mm$^2$/s, and the thickness of the graphene foam sheets is 200-300 μm. Higher density leads to higher thermal diffusivity but reduced flexibility. Samples with a density of 0.2-0.3 g/cm$^3$ are selected to balance thermal conductivity and flexibility. Thicker foam sheets incur higher production costs, but fewer graphene interfaces improve crack resistance. Thus, a thickness of 200-300 μm is chosen to balance cost and performance.

In some embodiments of the present invention, in step S20, the step of removing surface crusts includes crushing the surface crusts and adhering them to remove the crusts.

Specifically, the step of removing surface crusts is performed as follows. First, the laser focus distance of the laser perforation machine is adjusted. The laser is scanned on the sample surface at an appropriate speed. Local heating and softening occur under laser irradiation, and cooling and embrittlement occur when the laser moves away. Thermal expansion and contraction cause the surface crusts to fragment into small pieces, which are removed without damaging the internal foam in subsequent steps. Then, specifically, a double-roller press is adjusted so that the gap between the double rollers matches the thickness of the graphene foam sheet. Double-sided tape is evenly applied on the outer surfaces of the double rollers to facilitate subsequent crust removal. Then, the graphene foam sheet is fed horizontally from one side through the gap between the double rollers. As a result, the fragmented surface crusts from the graphene foam sheet are effectively removed by the adhesive force of the double-sided tape. Repeat the process by replacing the double-sided tape until all required graphene foam sheets have undergone crust removal. Although the surface crusts have high thermal conductivity, they exhibit high hardness under vertical alignment, are prone to brittle fracture under force, and lack flexibility.

In some embodiments of the present invention, in the step of laser perforation and edge trimming, the average aperture of the perforations is 10-200 μm, and the distance between the perforations is 100-4000 μm.

It is understandable that during the preparation of graphene foam sheets, the outermost layer loses moisture or heat faster than the interior, resulting in a surface that is denser and has fewer pores compared to the interior. Furthermore, coated graphene foam sheets have low density and require rolling to increase density and thermal conductivity. During the rolling process, the external and internal foam sheets experience uneven force, leading to higher density, higher crystallinity, and higher hardness on the outer graphene layer. This forms a relatively dense "skin" that is prone to fracture under stress, interrupting thermal pathways and thereby reducing thermal conductivity. Moreover, the denser surface also reduces the flexibility of the graphene foam sheets, preventing them from rebounding to a certain height after stress removal. Thus, removing the skin can make the graphene foam sheets more flexible, allowing them to better conform to the uneven surfaces of electronic components, thereby ensuring lower contact thermal resistance and minimizing air gaps that hinder heat conduction.

In some embodiments of the present invention, in step S20, the step of laser perforation and edge trimming includes placing the plurality of graphene foam sheets on a laser perforation platform for laser perforation and edge trimming. The purpose of laser perforation is to provide channels for subsequent reactants to enter the interior of the graphene foam sheets, thereby facilitating the subsequent reactions.

Further, in step S20, the plasma activation includes using direct injection plasma activation equipment. Specifically, the step includes setting a "Z"-shaped path to perform the plasma activation over the entire surface, thereby ensuring uniform activation of the graphene surface. After the plasma activation, the graphene foam sheets have abundant hydroxyl groups on the surface, thereby providing numerous reactive sites and enhancing the surface activity of the graphene.

In some embodiments of the present invention, the first modification treatment includes coating the activated graphene foam sheets with hydroxyvinyl silicone oil diluted with xylene, and after complete absorption, performing vacuum heat treatment to obtain the plurality of first graphene foam sheets. Specifically, the coating includes spraying 3-9 mg of hydroxyvinyl silicone oil per square centimeter of the activated graphene foam sheet. In such a way, it allows the hydroxyl groups generated by plasma activation to react with the hydroxyl groups of the hydroxyvinyl silicone oil, forming new chemical bonds. The reaction between the hydroxyvinyl silicone oil and the hydroxyl groups on the surface of the graphene foam sheets forms stable chemical bonds, thereby enhancing the adhesion between the coating and the substrate, preventing coating detachment, and improving mechanical strength and chemical stability.

In some embodiments of the present invention, in step S30, the second modification treatment includes uniformly spraying and mixing the adhesive with the plurality of first graphene foam sheets to obtain the plurality of second graphene foam sheets. Specifically, the spraying includes spraying 70-110 mg of the adhesive per square centimeter of the first graphene foam sheet. Here, spraying the adhesive onto the first graphene foam sheets can enhance the performance of the graphene foam sheets.

In some embodiments of the present invention, the adhesive includes linear low molecular weight vinyl silicone oil, linear medium molecular weight vinyl silicone oil, linear high molecular weight vinyl silicone oil, a crosslinking agent, a chain extender, a reinforcing agent, a toughening agent, the catalyst, and the inhibitor. The linear low molecular weight vinyl silicone oil is 50 cP vinyl silicone oil, the linear medium molecular weight vinyl silicone oil is 500 cP vinyl silicone oil, and the linear high molecular weight vinyl silicone oil is 20,000 cP vinyl silicone oil.

Specifically, the mass ratio of the 50 cP vinyl silicone oil, the 500 cP vinyl silicone oil, the 20,000 cP vinyl silicone oil, the chain extender, the crosslinking agent, the reinforcing agent, the toughening agent, the catalyst, and the inhibitor is (20-50):(60-130):(30-50):(15-25):(20-30):(3-5):(0.5-1.5): (0.3-0.6):(0.08-0.12).

In the technical solution of the present invention, the quality of the final product, the graphene thermal conductive pad, is improved by optimizing the strength, toughness, and surface tackiness of the cured adhesive. The addition of low molecular weight silicone oil ensures the adhesive has low viscosity, facilitating absorption by the graphene foam sheets after spraying. The medium molecular weight silicone oil has a moderate molecular weight, balancing viscosity and strength. The high molecular weight silicone oil increases the elongation at break of the adhesive. MQ resin acts as a reinforcing agent, increasing the toughness after curing. Fumed silica enhances the toughness after curing. Within the above ratio range, the prepared adhesive exhibits better adhesion to the graphene foam sheets, which improves the performance of the graphene foam sheets.

In some embodiments of the present invention, the mass ratio of the first graphene foam sheets to the adhesive is 1:(1-3).

In some embodiments of the present invention, in the adhesive, the linear low molecular weight vinyl silicone oil is low molecular weight silicone oil with a viscosity below 500 cP, which has low viscosity and abundant reactive functional groups, and provides better fluidity and absorption for the adhesive. The linear medium molecular weight vinyl silicone oil includes medium molecular weight silicone oil with a viscosity of 500-5000 cP, specifically linear difunctional vinyl silicone oil with a viscosity above 500 cP and below 5000 cP, which has appropriate viscosity and reactive functional groups, and provides moderate strength after curing. The linear high molecular weight vinyl silicone oil includes VS 20000, specifically linear difunctional vinyl silicone oil with a viscosity above 5000 cP, which has higher viscosity and fewer reactive functional groups, and provides higher strength after curing.

The crosslinking agent includes side-hydrogen silicone oil; and/or, the chain extender includes end-hydrogen silicone oil; and/or, the reinforcing agent includes MQ resin; and/or, the toughening agent includes nano-grade fumed silica.

In some embodiments of the present invention, the preparation steps of the adhesive include mixing the linear low molecular weight vinyl silicone oil, the linear medium molecular weight vinyl silicone oil, the linear high molecular weight vinyl silicone oil, the crosslinking agent, the chain extender, the catalyst, the inhibitor, the reinforcing agent, and the toughening agent.

In some embodiments of the present invention, in step S40, the thickness of the third graphene foam sheet is 40-50 mm, which can be flexibly adjusted according to testing requirements.

In some embodiments of the present invention, in step S50, the thickness of the graphene thermal conductive pad is 0.3-2.0 mm. This range ensures the full utilization of the inherent high thermal conductivity of graphene, thereby allowing heat to be rapidly transferred from the heat source to the heat sink or other cooling devices, and improving the overall heat exchange efficiency of the system. At the same time, it can adapt to contact surfaces of different shapes and sizes, ensuring good conformity, reducing air gaps, and thereby lowering thermal resistance.

The present invention also provides a graphene thermal conductive pad which is prepared by the method for preparing a graphene thermal conductive pad as described above. The graphene thermal conductive pad possesses all the beneficial effects of the aforementioned preparation method, which will not be reiterated here.

The technical solutions of the present invention are further described in detail below in conjunction with specific examples. It should be understood that the following examples are merely intended to explain the present invention and not to limit the present invention.

Experimental Materials

Hydroxyvinyl silicone oil was sourced from Zhejiang Zhenghe Silicon Material Co., Ltd., model 207V-2.5.

The following silicone oils were all sourced from Anbiya Specialty Silicones (Nantong) Co., Ltd., only the specific models are listed below:

50 cP vinyl silicone oil, model VS 50;

500 cP vinyl silicone oil, model VS 500;

20,000 cP vinyl silicone oil, model VS 20000;

0.2% end-hydrogen silicone oil, model CE 100;

0.34% side-hydrogen silicone oil, model XL 12.

MQ resin was sourced from Kangda Technology, model VMQ-2709.

Nano-grade fumed silica was sourced from Hubei Huifu Nanomaterial Co., Ltd., model HB139.

Example 1

A method for preparing a graphene thermal conductive pad includes the following steps:

S10: Providing 43 graphene foam sheets with a thermal diffusivity of 650 mm$^2$/s, a density of 0.2 g/cm$^3$, and dimensions of 100*100*350 mm (length*width*height);

S20: Adsorbing the 43 graphene foam sheets onto a surface using a vacuum table, and using a laser perforation machine, specifically setting a 1500 W power laser focused 2 mm above the graphene surface, forming an effective circle with a diameter of 1 mm, and scanning rapidly at 10 mm/s; pasting a bonding area as wide as the graphene foam sheets on a roller press with a diameter of 300 mm, adjusting the gap between the double rollers to match the thickness of the graphene foam sheets, then feeding the graphene foam sheets from one side to perform surface crust removal on partial areas; and repeating the operation to remove the crusts from the entire surface of all graphene foam sheets, thereby obtaining 43 first graphene foam sheets with the hardened surface crusts removed, having a thickness of 300 μm (±15 μm);

S30: Performing laser perforation and edge trimming on the 43 first graphene foam sheets; specifically, placing the 43 first graphene foam sheets on a laser perforation platform, simultaneously performing laser perforation and edge trimming operations. The aperture is 50 μm, the perforation pitch is 1000 μm, with upper and lower rows staggered by 1000 μm in an A/B/A/B repeating pattern. The edge trimming size is 50 mm*50 mm to facilitate subsequent plasma activation.

The specific treatment for the plasma activation is as follows: placing the samples in a plate frame with a grid, and using a direct injection plasma activation equipment, with setting the power to 800 W, the horizontal height of the spray gun from the sample to 10 mm, and the spray gun nozzle size to a circle with a diameter of 10 mm. Using the projection method, the calculated effective treatment area is a circle with a diameter of 20 mm, so the moving speed of the spray gun is 5 mm/s, moving down 20 mm when changing lines.

A "Z"-shaped path is set to perform plasma activation over the entire surface, thereby obtaining activated graphene foam sheets.

The treatment further includes evenly spraying the activated graphene foam sheets with hydroxyvinyl silicone oil diluted 10 times with xylene using a spraying machine, and controlling the spraying amount to 6 mg/cm². After the hydroxyvinyl silicone oil is fully absorbed, 43 first graphene foam sheets are obtained. Then the 43 first graphene foam sheets are subjected to a second modification treatment with an adhesive. The specific treatment includes spraying the adhesive onto the plurality of first graphene foam sheets and mixing to obtain a plurality of second graphene foam sheets, and controlling the spraying amount to 90 mg of adhesive per square centimeter of the first graphene foam sheet. That is, 43*4=172 second graphene foam sheets with dimensions of 50*50 mm are obtained.

S40: Placing the 172 second graphene foam sheets in a mold, stacking them together; after stacking all 172 sheets, placing a square aluminum block of 50*50*5 mm on the top and bottom, using an automatic pushing device to apply a certain pressure on the aluminum blocks, making the graphene foam sheets closely adhere to each other; locking the aluminum blocks when the overall distance between them is 51.6 mm; and placing the entire device in an oven and heat at 120° C. for 2 hours for curing, thereby obtaining a third graphene foam sheet;

S50: Removing the third graphene foam sheet from the oven, taking it out from the module, cutting off the surface residual adhesive with a knife, and placing it on the operating table of a diamond cutting machine; then setting the cutting thickness to 300 μm and slicing along the thickness direction to obtain a graphene thermal conductive pad.

Specifically, the specific components and dosages of the adhesive are as follows: 20 parts of 50 cP vinyl silicone oil, 100 parts of 500 cP vinyl silicone oil, 30 parts of 20,000 cP vinyl silicone oil, 20 parts of 0.2% end-hydrogen silicone oil, 25 parts of 0.34% side-hydrogen silicone oil, 4 parts of MQ resin, 1 part of nano-grade fumed silica, 0.5 parts of 5000 ppm platinum catalyst, and 0.1 part of alkyne alcohol inhibitor.

Example 2

Differing from Example 1, the specific components and dosages of the adhesive used in Example 2 follow: 50 parts of 50 cP vinyl silicone oil, 70 parts of 500 cP vinyl silicone oil, 30 parts of 20,000 cP vinyl silicone oil, 15 parts of 0.2% end-hydrogen silicone oil, 20 parts of 0.34% side-hydrogen silicone oil, 3 parts of MQ resin, 0.5 parts of nano-grade fumed silica, 0.3 parts of 5000 ppm platinum catalyst, and 0.08 parts of alkyne alcohol inhibitor.

Example 3

Differing from Example 1, the specific components and dosages of the adhesive used in Example 3 follow: 20 parts of 50 cP vinyl silicone oil, 70 parts of 500 cP vinyl silicone oil, 60 parts of 20,000 cP vinyl silicone oil, 20 parts of 0.2% end-hydrogen silicone oil, 25 parts of 0.34% side-hydrogen silicone oil, 4 parts of MQ resin, 1 part of nano-grade fumed silica, 0.5 parts of 5000 ppm platinum catalyst, and 0.1 parts of alkyne alcohol inhibitor.

Example 4

Differing from Example 1, the specific components and dosages of the adhesive used in Example 4 follow: 30 parts of 50 cP vinyl silicone oil, 130 parts of 500 cP vinyl silicone oil, 40 parts of 20,000 cP vinyl silicone oil, 20 parts of 0.2% end-hydrogen silicone oil, 25 parts of 0.34% side-hydrogen silicone oil, 4 parts of MQ resin, 1 part of nano-grade fumed silica, 0.5 parts of 5000 ppm platinum catalyst, and 0.1 parts of alkyne alcohol inhibitor.

Example 5

The difference from Example 1 lies only in the components and dosage of the adhesive. Specifically, the detailed formulation of the adhesive in Example 5 is as follows: 40 parts of 500 cP vinyl silicone oil, 60 parts of 50 cP vinyl silicone oil, 50 parts of 20,000 cP vinyl silicone oil, 25 parts of 0.2% end-hydrogen silicone oil, 30 parts of 0.34% side-hydrogen silicone oil, 5 parts of MQ resin, 1.5 parts of nano-grade fumed silica, 0.6 parts of 5000 ppm platinum catalyst, and 0.12 parts of alkyne alcohol inhibitor.

Comparative Example 1

The difference from Example 1 lies in the omission of the step of "mixing the activated graphene foam sheets with hydroxyvinyl silicone oil at a mass ratio of 1:1.5 to obtain 43 first graphene foam sheets", that is, the modification treatment was not performed.

Performance Testing (1) Heat Transfer Efficiency Test

The graphene thermal conductive pads prepared in Examples 1-5 were tested for heat transfer efficiency.

The test standard: ASTM D5470.

Test method: Select a sample of 2.54 cm*2.54 cm*300 μm (length*width*height), set parameters as: heat source 80° C., pressure 20 psi, and test time 25 min. The test results are shown in Table 1 below.

TABLE 1

| Test Item | Thermal Conductivity (W/m · K) |
|---|---|
| Example 1 | 24.89 |
| Example 2 | 17.57 |
| Example 3 | 25.03 |
| Example 4 | 25.40 |
| Example 5 | 25.32 |
| Comparative Example 1 | 10.11 |

(2) Tensile Strength Test

Test standard: GB/T 528-2009;

Test method: Prepare the sample into a dumbbell-shaped tensile specimen of 0.3 mm thickness and 10 mm width, conduct the tensile test at a speed of 300 mm/min, and record the tensile strength along the orientation direction and the direction perpendicular to the orientation. The test results are shown in Table 2.

TABLE 2

| Test Item | Tensile Strength (MPa) |
|---|---|
| Example 1 | 0.083 |
| Example 2 | 0.095 |
| Example 3 | 0.051 |
| Example 4 | 0.036 |
| Example 5 | 0.028 |
| Comparative Example 1 | 0.017 |

(3) Compression Set and Resilience Test

Test standard: GBIT 528-2009.

Test method: Select a sample of the same size as the presser foot, compress to 50% of the original thickness and maintain for 30 min, record the compression amount; then remove the pressure, allow recovery for 10 min, and record the recovery amount. The rebound rate is calculated as =(Recovery amount/Compression amount)*100%. The results are shown in Table 3.

TABLE 3

| Test Item | Compression Rebound Rate (%) |
|---|---|
| Example 1 | 94 |
| Example 2 | 98 |
| Example 3 | 90 |
| Example 4 | 83 |
| Example 5 | 79 |
| Comparative Example 1 | 89 |

(4) Crack Resistance Test Under Extreme Pressure

Test method: Place a standard-sized graphene sample (25.4 mm length & width, 300 μm thickness) under a universal testing machine, observe at different compression ratios (starting from 0%, increasing by 5% each time), maintain each pressure for 30 min, then remove the pressure and observe whether the sample cracks; and record the compression ratio at which cracking occurs. The test results are shown in Table 4.

TABLE 4

| Test Item | Compression Ratio at Cracking (%) |
|---|---|
| Example 1 | 75 |
| Example 2 | 40 |
| Example 3 | 75 |
| Example 4 | 80 |
| Example 5 | 85 |
| Comparative Example 1 | 10 |

In summary, it can be concluded that the multiple modification treatments in the present invention enable the thermal conductive pad to better contact components and effectively fill air gaps, thereby improving the performance of the graphene thermal conductive pad.

The foregoing is merely preferred embodiments of the present invention and is not intended to limit the patent scope of the present invention. For those skilled in the art, various modifications and changes can be made to the present invention. Any modifications, equivalent replacements, improvements, etc., made within the spirit and principles of the present invention shall be included within the scope of patent protection of the present invention.

What is claimed is:

1. A method for preparing a graphene thermal conductive pad, comprising the following steps:
   S10, providing a plurality of graphene foam sheets;
   S20, removing surface crusts from the plurality of graphene foam sheets, performing laser perforation and edge trimming, and plasma activation to obtain activated graphene foam sheets; subjecting the activated graphene foam sheets to a first modification treatment with hydroxyvinyl silicone oil to obtain a plurality of first graphene foam sheets;
   S30, subjecting the plurality of first graphene foam sheets to a second modification treatment with an adhesive to obtain a plurality of second graphene foam sheets;

S40, bonding the plurality of second graphene foam sheets along a thickness direction and pressing into a block, followed by curing, to obtain a third graphene foam sheet; and
   S50, slicing the third graphene foam sheet along the thickness direction to obtain a graphene thermal conductive pad;
   wherein the adhesive comprises linear low molecular weight vinyl silicone oil, linear medium molecular weight vinyl silicone oil, linear high molecular weight vinyl silicone oil, a crosslinking agent, a chain extender, a reinforcing agent, a toughening agent, a catalyst, and an inhibitor.

2. The method for preparing a graphene thermal conductive pad according to claim 1, wherein in step S10,
   an average density of the graphene foam sheets is 0.15-0.25 g/cm$^3$; and/or,
   a thermal diffusivity of the graphene foam sheets is ≥600 mm$^2$/s; and/or,
   a thickness of the graphene foam sheets is 200-300 μm.

3. The method for preparing a graphene thermal conductive pad according to claim 1, wherein in step S20,
   said removing surface crusts comprises: crushing and adhering the surface crusts; and/or,
   after the laser perforation and edge trimming, an average aperture of perforations is 10-200 μm, and a distance between the perforations is 100-4000 μm; and/or,
   the plasma activation comprises using a direct injection plasma activation equipment; and/or,
   the first modification treatment comprises coating the activated graphene foam sheets with hydroxyvinyl silicone oil diluted with xylene, and after complete absorption, performing vacuum heat treatment to obtain the plurality of first graphene foam sheets, wherein the coating comprises spraying 3-9 mg of hydroxyvinyl silicone oil per square centimeter of the activated graphene foam sheets.

4. The method for preparing a graphene thermal conductive pad according to claim 1, wherein in step S30, the second modification treatment comprises spraying the adhesive onto the plurality of first graphene foam sheets and mixing to obtain the plurality of second graphene foam sheets, wherein the spraying comprises spraying 70-110 mg of the adhesive per square centimeter of the first graphene foam sheets.

5. The method for preparing a graphene thermal conductive pad according to claim 4, wherein the linear low molecular weight vinyl silicone oil is 50 cP vinyl silicone oil, the linear medium molecular weight vinyl silicone oil is 500 cP vinyl silicone oil, and the linear high molecular weight vinyl silicone oil is 20,000 cP vinyl silicone oil;
   wherein a mass ratio of the 50 cP vinyl silicone oil, the 500 cP vinyl silicone oil, the 20,000 cP vinyl silicone oil, the chain extender, the crosslinking agent, the reinforcing agent, the toughening agent, the catalyst, and the inhibitor is (20-50):(60-130):(30-50):(15-25):(20-30):(3-5):(0.5-1.5):(0.3-0.6):(0.08-0.12); and/or,
   a mass ratio of the first graphene foam sheets to the adhesive is 1:(1-3).

6. The method for preparing a graphene thermal conductive pad according to claim 5, wherein in the adhesive,
   the linear low molecular weight vinyl silicone oil comprises low molecular weight silicone oil with a viscosity of 500 cP or less; and/or,
   the linear medium molecular weight vinyl silicone oil comprises medium molecular weight silicone oil with a viscosity of 500-5000 cP; and/or, the linear high molecular weight vinyl silicone oil comprises high molecular weight silicone oil with a viscosity above 5000 cP; and/or, the crosslinking agent comprises side-hydrogen silicone oil; and/or, the chain extender comprises end-hydrogen silicone oil; and/or, the reinforcing agent comprises MQ resin; and/or, the toughening agent comprises nano-grade fumed silica; and/or, the catalyst comprises a platinum catalyst; and/or, the inhibitor comprises an alkyne alcohol inhibitor.

7. The method for preparing a graphene thermal conductive pad according to claim 5, wherein preparation steps of the adhesive comprise:

mixing the linear low molecular weight vinyl silicone oil, the linear medium molecular weight vinyl silicone oil, the linear high molecular weight vinyl silicone oil, the crosslinking agent, the chain extender, the catalyst, the inhibitor, the reinforcing agent, and the toughening agent.

8. The method for preparing a graphene thermal conductive pad according to claim 1, wherein in step S40, a thickness of the third graphene foam sheet is 40-50 mm; and/or, in step S50, a thickness of the graphene thermal conductive pad is 0.3-2.0 mm.

9. A graphene thermal conductive pad, prepared by the method for preparing a graphene thermal conductive pad according to claim 1.

\* \* \* \* \*